Patented June 18, 1929.

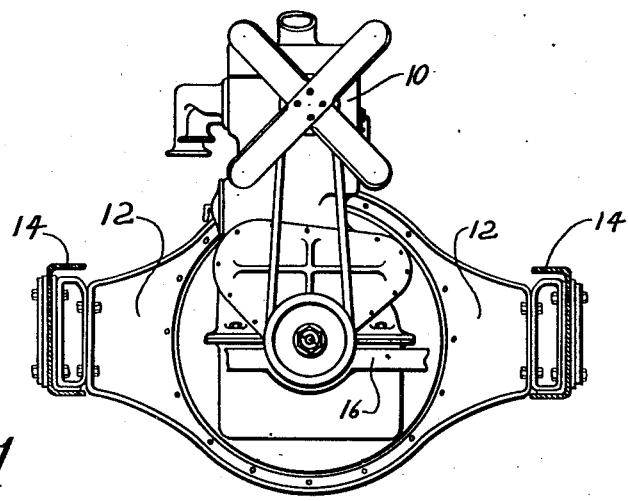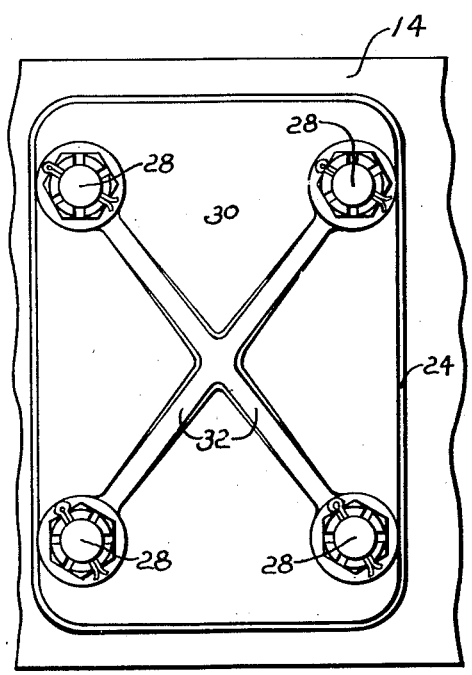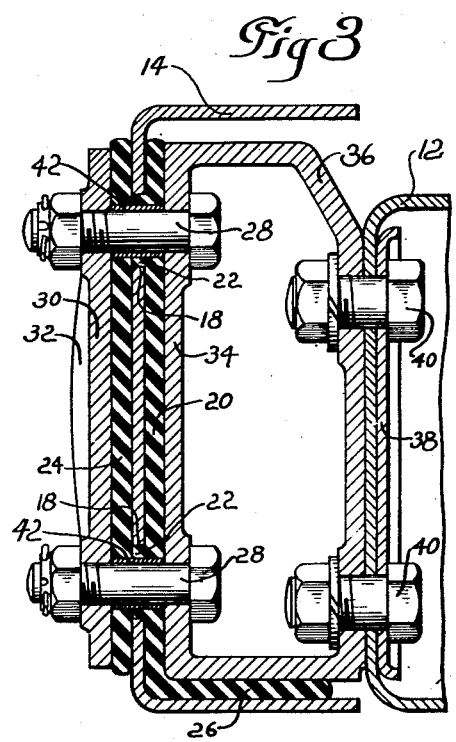

1,717,711

UNITED STATES PATENT OFFICE.

ROGER K. LEE, OF DETROIT, MICHIGAN, ASSIGNOR TO CHRYSLER CORPORATION, OF HIGHLAND PARK, MICHIGAN, A CORPORATION OF DELAWARE.

MOTOR MOUNTING.

Application filed August 17, 1927. Serial No. 213,587.

This invention relates to an engine mounting and more particularly to a mounting for the rear end of an engine supported between parallel frame members such as an automobile frame.

An important object of the invention is to provide a resilient mounting which securely supports the engine in such a manner as to stiffen the frame. Heretofore resilient mountings have been provided for the engine but such mountings require an additional element such as a cross member to stiffen the frame at the point where the engine is supported.

It is another object of this invention to provide a resilient support which absorbs or dampens out the inherent vibrations of the engine before they reach the frame or supporting member by permitting slight horizontal and vertical movement of the engine.

Other objects and advantages will more fully appear from the following description taken in connection with the accompanying drawings in which:

Fig. 1 is an end view of an engine showing it supported between frame members by my improved mounting.

Fig. 2 is a side elevation of the outer portion of my mounting.

Fig. 3 is a sectional view thru the mounting, frame and a portion of the engine supporting arm.

Referring to an illustrated embodiment of my invention, the reference numeral 10 indicates an internal combustion engine having lateral projections 12 which are secured to the mounting supported by parallel frame members 14. This support is shown at the rear end of the motor and the forward end is supported centrally on a transverse frame member 16.

The side portion of the channel frame member 14 is provided with openings 18 and a non-metallic pad such as rubber is placed adjacent the opposite side of each frame member. One pad shown as an inner pad 20 is provided with ring like flanges 22 adapted to fit the openings 18 and bear against the other or outer pad 24. The inner pad 20 is further provided with a lower portion 26 which rests on the lower flange of the frame member. Outer and inner plates are placed next to the outer surfaces of the pads which are bolted together by bolts 28, pinching the pads therebetween. The outer plate 30 is provided with ribs 32 which stiffen it and the inner plate 34 is formed as a projecting bracket 36 to which the engine arm 12 is secured. The projecting bracket 36 is provided to permit the engine to be placed in the support or removed therefrom vertically without disturbing the mounting and to permit the outer ends of the arms 12 to clear the upper or lower flanges of the frame member. A plate 38 has been shown to further stiffen the arm 12 and bolts 40 secure the arm to the bracket 36.

Metallic sleeves 42 are shown to form abutments for the plates 30 and 34 and are shorter than the free thickness of the pads 20 and 24 so that the pads may be compressed. The lower portion 26 of the inner pad resiliently supports the bracket 36 and engine. The entire weight of the engine is not supported on the lower portion of the inner pad because a greater portion of the weight is supported by the frictional grip on the side portion of the frame member; it being understood that the mounting is secured to the frame before the engine is secured to the mounting.

A rigid metallic connection is formed from the outer side of one frame member, thru the engine to the outerside of the other frame member forming in effect a rigid transverse frame member resiliently secured to the side frame members as well as a resilient engine mounting. The parts are few, inexpensive to manufacture and the mounting as well as the engine is easily assembled.

It is to be understood that various changes may be made in the arrangement, combination and construction of the various parts of my improved device without departing from the spirit of my invention and it is my intention to cover by my claims such changes as may be reasonably included within the scope thereof.

What I claim is:

1. In combination, an internal combustion engine having lateral projecting arms extending therefrom, a pair of plates at the inner and outer sides of supporting frame members, a pair of non-metallic pads at the opposite sides of said supporting members and between said plates, means for securing said arms to the inner plates, metallic members thru said pads engaging the inner surfaces of said plates, and means for securing said plates against said pads and said metallic members.

2. In combination, an internal combustion engine having lateral projecting arms extending therefrom, a pair of supporting frame members, rigid members at the opposite sides of said frame members respectively, means for rigidly connecting said rigid members with respect to each other, resilient means between said frame members and said rigid members, and means for securing said arms to said rigid members.

3. A mounting of the class described comprising a resilient pad on the opposite sides of a frame member, rigid plates adjacent said pads, rigid sleeves thru said resilient pads and frame member engaging said plates, bolts extending thru said sleeves and said plates, and means for securing a member to one of said plates.

4. A mounting of the class described comprising, resilient pads on the opposite sides of a frame member, ring like projections on one of said pads adapted to extend thru openings in the frame member, a rigid sleeve thru said ring like flanges, rigid plates on the opposite sides of pads, means for pinching said plates together to cause them to compress said resilient pads and engage the opposite ends of said sleeves, and means for securing a member to one of said plates.

5. A mounting of the class described comprising, a channel shaped frame member, a resilient pad on the outer central surface of said frame member, a resilient pad on the inner surface of the central portion and the upper surface of the lower flange of said frame member, a rigid plate engaging the outer surface of one of said pads, a rigid plate engaging the inner surface of the other pad and the upper surface of the pad portion on the lower flange, means for rigidly securing said plates together, and means for securing a member to said last named plate.

6. A mounting of the class described comprising, a channel shaped frame member, a resilient pad on the outer central surface of said frame member, a resilient pad on the inner surface of the central portion and the upper surface of the lower flange of said frame member, projections on one of said pads extending thru said frame member, rigid sleeves extending thru said projections, a rigid plate on the outer surface of one of said pads, a rigid plate engaging the inner surface of the other pad and the upper surface of the pad portion on the lower flange, means extending thru said sleeves for securing said plates together, and means projecting beyond the flanges of said frame member for securing a member to said last named plate.

7. An engine mounting of the class described comprising, a pair of channel shaped frame members, an engine having lateral projecting arms extending therefrom, means for resiliently supporting a rigid member extending thru said frame members and resiliently engaging the outer and inner surfaces of said frame members, and means projecting beyond the flanges of said frame member for rigidly securing said arms to said rigid member.

8. A mounting of the class described comprising, a channel shaped frame member, an internal combustion engine having an outwardly extending arm, means for forming a connection between said arm and said frame member, and a resilient pad in continuous contact with two adjacent sides of said frame member, between said frame member and said arm.

9. A mounting of the class described, a channel frame member having openings through its control surface, resilient means on the opposite faces of the central portion of said frame member and extending through the openings in said frame member separate rigid members on the outer faces of said resilient means, and means extending through the resilient means in the openings of said frame member for rigidly securing said rigid members together.

10. A mounting of the class described comprising a channel frame member, separate rigid members at the opposite sides of the central portion of said channel frame member, means for rigidly securing said rigid members together, and resilient means between said rigid members and said frame member.

11. A mounting of the class described comprising, a frame member having openings therein, a resilient pad on the outer surface of said frame member, a resilient pad on the inner surface of said frame member, said pads having openings in axial alignment with the openings in said frame member, flanges around the openings on one of said pads extending through the openings in said frame and engaging the other resilient pad, a rigid plate on the outer faces of said resilient pads having openings in alignment with the openings in the pads and frame, means extending through the aligned openings for holding said members in assembled relation, and means for securing a member to one of said plates.

12. A mounting of the class described comprising, a frame member having openings therein, a resilient pad on the outer surface of said frame member, a resilient pad on the inner surface of said frame member, said pads having openings in axial alignment with the openings in said frame member, flanges around the openings in one of said pads extending through the openings in said frame and engaging the other resilient pad, a rigid plate on the outer faces of said resilient pads having openings in alignment with the openings in the pad and frame, bolts extending through the aligned openings for drawing said plates together, and means for securing a member to one of said plates.

13. A mounting of the class described comprising a frame member having openings therein, resilient means on the opposite sides of said frame member and through the openings in said frame member, said resilient means being provided with openings in axial alignment with the openings in said frame, rigid supporting member engaging one face of said resilient means, a rigid plate engaging the opposite face of said resilient means, and means extending through the openings in said resilient means for securing said plate and said supporting member in assembled relation.

14. A mounting of the class described comprising a frame member having an opening therein, resilient means on the opposite sides of said frame member and through the opening in said frame member, and a rigid supporting member engaging the opposite faces of said resilient means.

ROGER K. LEE.